United States Patent [19]

Nelson

[11] Patent Number: 5,060,789
[45] Date of Patent: Oct. 29, 1991

[54] CONVEYOR ANTI-RUNAWAY APPARATUS

[75] Inventor: Lester R. Nelson, Belvidere, Ill.

[73] Assignee: Chrysler Corporation, Highland Park, Mich.

[21] Appl. No.: 640,793

[22] Filed: Jan. 14, 1991

[51] Int. Cl.5 .............................................. B65G 23/00
[52] U.S. Cl. ................................ 198/832.3; 104/249; 104/89
[58] Field of Search ........................ 198/832.2, 832.3; 104/89, 249

[56] References Cited

U.S. PATENT DOCUMENTS

| 1,806,913 | 5/1931 | Paquette | 104/249 X |
| 3,149,715 | 9/1964 | Massimiani | 104/249 |

FOREIGN PATENT DOCUMENTS

| 0818993 | 4/1981 | U.S.S.R. | 198/832.2 |
| 0810581 | 5/1981 | U.S.S.R. | 198/832.2 |
| 0856934 | 8/1981 | U.S.S.R. | 198/832.2 |
| 1009938 | 4/1983 | U.S.S.R. | 198/832.2 |
| 1525092 | 11/1989 | U.S.S.R. | 198/832.3 |

Primary Examiner—Joseph E. Valenza
Assistant Examiner—Cheryl L. Gastineau
Attorney, Agent, or Firm—Edward A. Craig

[57] ABSTRACT

A conveyor anti-runaway apparatus is provided for a conveyor of the type driven by an electric motor connected to a source of electrical power. The anti-runaway apparatus includes a switch tripping device having a tripping arm structure which is periodically bumped by conveyor wheel structure and which is caused to pivot into a switch opening position when the conveyor speed is unacceptably high. The tripping arm structure also functions as a blocking element to prevent conveyor movement. Jackscrew structure is provided to permit rapid disengagement of the tripping arm structure to facilitate restart of the conveyor.

3 Claims, 3 Drawing Sheets

CONVEYOR ANTI-RUNAWAY APPARATUS

BACKGROUND OF THE INVENTION

1. Field of Invention

A conveyor anti-runaway apparatus is provided for a conveyor of the type driven by an electric motor connected to a source of electrical power.

2 Prior Art

A common problem which occurs in connection with use of large industrial conveyors, such as those used in automotive assembly plants, is sporadic large increases in conveyor speed. Such speed increases endanger the safety of assembly operators.

In order to resolve this problem, devices termed "conveyor anti-runaways" have been provided. These devices sense, by various means, conveyor chain speeds and detect sudden increases in conveyor speed. Conventionally, such devices automatically physically jam the conveyor chain and stop all movement when the conveyor speed reaches unacceptable levels. Increased conveyor speed can be caused by various conditions. For example, a production part may fall from the conveyor and become wedged between the conveyor chain rollers and the channel that the chain follows. Very large forces can then build up in the conveyor chain drive motor causing the chain to stretch. When the stretching force overcomes the wedged production part, the chain is suddenly released with thousand of pounds of force. In a manner similar to shooting a rubber band, the chain speed increases to dangerous velocities. All assembly workers near the conveyor are endangered as they may be struck and injured by the conveyor or by production parts on the conveyor.

Standard anti-runaway devices have been effective in the past. However, one problem encountered in connection with such devices is that they have required rather extensive time to permit restarting of production. For example, such restart time may be thirty-five minutes with two millwrights and one electrician working together. This down time results in lost production and constitutes a very substantial monetary loss. In accordance with th present invention, a conveyor anti-runaway apparatus is provided which is effective in operation but which requires only a short time to permit restart, for example, about two minutes.

SUMMARY OF THE INVENTION

A conveyor anti-runaway apparatus is provided for a conveyor of the type driven by an electric motor connected to a source of electrical power. The conveyor includes a plurality of spaced apart wheel structures along the length thereof which run on rails.

The conveyor anti-runaway apparatus comprises a normally closed electric switch connected between the conveyor electric motor and the source of electrical power. The electric switch includes a switch actuator movable between closed and open positions. A switch tripping device is mounted on the upper side of a conveyor rail. A tripping arm structure is provided. A pivot mount pivotably mounts the tripping arm structure o the switch tripping device. The tipping arm structure has an upper segment on one side of the pivot mount and a lower segment on the other side of the pivot mount.

The lower segment extends into the path of the conveyor wheel structures to be bumped thereby and cause pivoting of the tripping arm structure each time a wheel structure passes by. The tripping arm structure includes an elongated arm portion extending from the pivot mount at substantially right angles to the upper and lower segments. The moment of the elongated arm portion about the pivot mount is sufficient to cause the tripping arm structure to return to its normal position each time it is bumped by a wheel structure which is moving at an acceptably low speed and insufficient to cause such return when the wheel structure is moving at an unacceptably high speed resulting in the tripping arm structure pivoting entirely around the pivot mount into contact with the switch actuator causing the switch actuator to move to the open position thus interrupting electrical power to the electric motor and causing the conveyor to stop.

The elongated arm portion includes a stop structure adjacent the end thereof remote from the pivot mount. The stop structure abuts against the conveyor rail when the tripping arm structure is in its normal position and also when the tripping arm structure is pivoted to cause the switch actuator to move to the open position to thereby prevent further pivoting in either direction. The upper segment moves into the path of the conveyor wheel structure when the tripping arm structure is pivoted to cause the switch actuator to move to the open position and thereafter functions to block passage of conveyor wheel structures thereby.

The electric switch is mounted on the switch tripping device. The switch tripping device is pivotably mounted on the conveyor rail. A jackscrew support structure is provided including an internally threaded opening. The jackscrew support structure extends upwardly from the conveyor rail. A jackscrew threadingly extends through the opening. Manually engagable crank means are provided on one end of the jackscrew. The other end of the jackscrew is rotatably connected to the switch tripping device whereby the tripping arm structure is movable out of its wheel structure blocking position by actuation of the jackscrew to pivot the switch tripping device upwardly and away from the conveyor rail so that the tripping arm structure can be manually pivoted back to its initial position to reset the switch tripping device to permit restartlng of the conveyor.

Preferably, the upper segment and lower segment of the tripping arm structure are connected together and define a crescent shape. The crescent shape defines a curved surface which functions as a camming surface for the conveyor wheel structures to facilitate passage thereby.

IN THE DRAWINGS

DETAILED DESCRIPTION OF A PREFERRED EMBODIMENT

Figure 6:
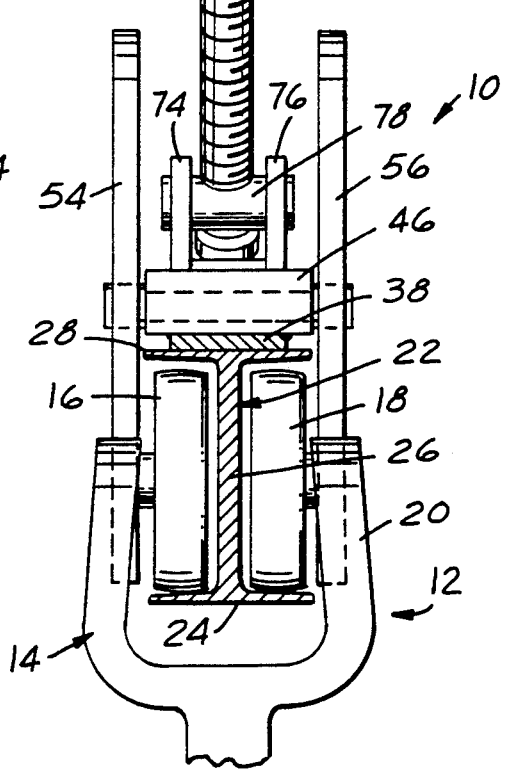
FIG. 6 is a sectional view taken substantially along the line 6—6 of FIG. 4 looking in the direction of the arrows.

The conveyor anti-runaway apparatus 10 of the present invention is adapted for use in connection with a conveyor of the type driven by an electric motor connected to a source of electrical power. The electric motor drives a chain which, in turn, causes transportation of articles carried by the conveyor. Portions of a typical conveyor 12 are illustrated in the present drawings. The conveyor 12 includes a plurality of spaced apart wheel structures 14. The wheel structures 14 are load bearing and support the driven conveyor chain (not shown). As will be noted in FIGS. 1 and 6, the wheel structures 14 include a pair of spaced apart wheels 16, 18 rotatably supported by a castor structure 20. Rails 22 are provided as part of the conveyor structure. The rails 22 are in the form of I-beams and include a lower flange 24 upon which the wheels 16, 18 roll. The center web 26 prevents the wheels 16, 18 from escape. The upper flange 28 is utilized for mounting the anti-runaway apparatus of the present invention. The castor structure 20 extends from the flange 24 into connection with a conveyor chain (not shown).

Figure 7:
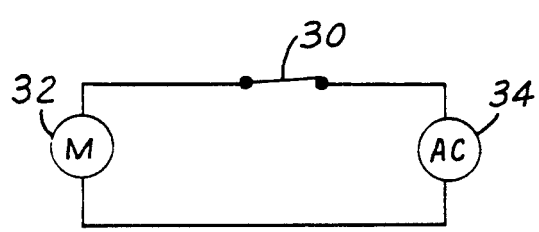
FIG. 7 is an electrical schematic diagram showing the conveyor anti-runaway electrical switch connections.

As will be noted in the figures, the conveyor anti-runaway apparatus 10 includes a normally closed electric switch 30 mounted on a plate 38. The plate 38 normally rests on the flange 28. As shown in FIG. 7, the switch 30 is connected between the conveyor electric motor 32 and a source of electrical power 34. The electric switch 30 includes a switch actuator 36 movable between closed and open positions. The switch actuator 36 is biased towards the closed position.

A switch tripping device 40 is also mounted on the plate 38. The device 40 includes a tripping arm structure 42 which is pivotably mounted on the plate 38 by means of a pivot mount pin 44. The pivot mount pin 44 is rotatably received in a bearing block 46 which is secured to the plate 38 as by welding. The tripping arm structure 42 comprises a pair of spaced apart arm elements 48, 50 which are secured together at one end by means of a cylindrical element 52. The pivot mount pin 44 secures the other ends of arm elements 48, 50 together.

Each arm element 48, 50 includes a crescent portion 54, 56 each of which is secured intermediate its ends to the pivot mount pin 44. Each crescent portion 54, 56 has a curved outer surface 58, 60. An elongated arm portion 62, 64 extends from each crescent portion 54, 56. The cylindrical element 52 connects the outer ends of arm portions 62, 64 together. The moment of the arm portions 62, 64 about the pivot mount pin 44 causes the tripping arm structure to pivot either to the normal position shown in FIG. 1 or the tripping position shown in FIG. 4 when it is caused to pivot overcenter of the pivot mount pin 44 as will be later described.

Figures 1, 2:
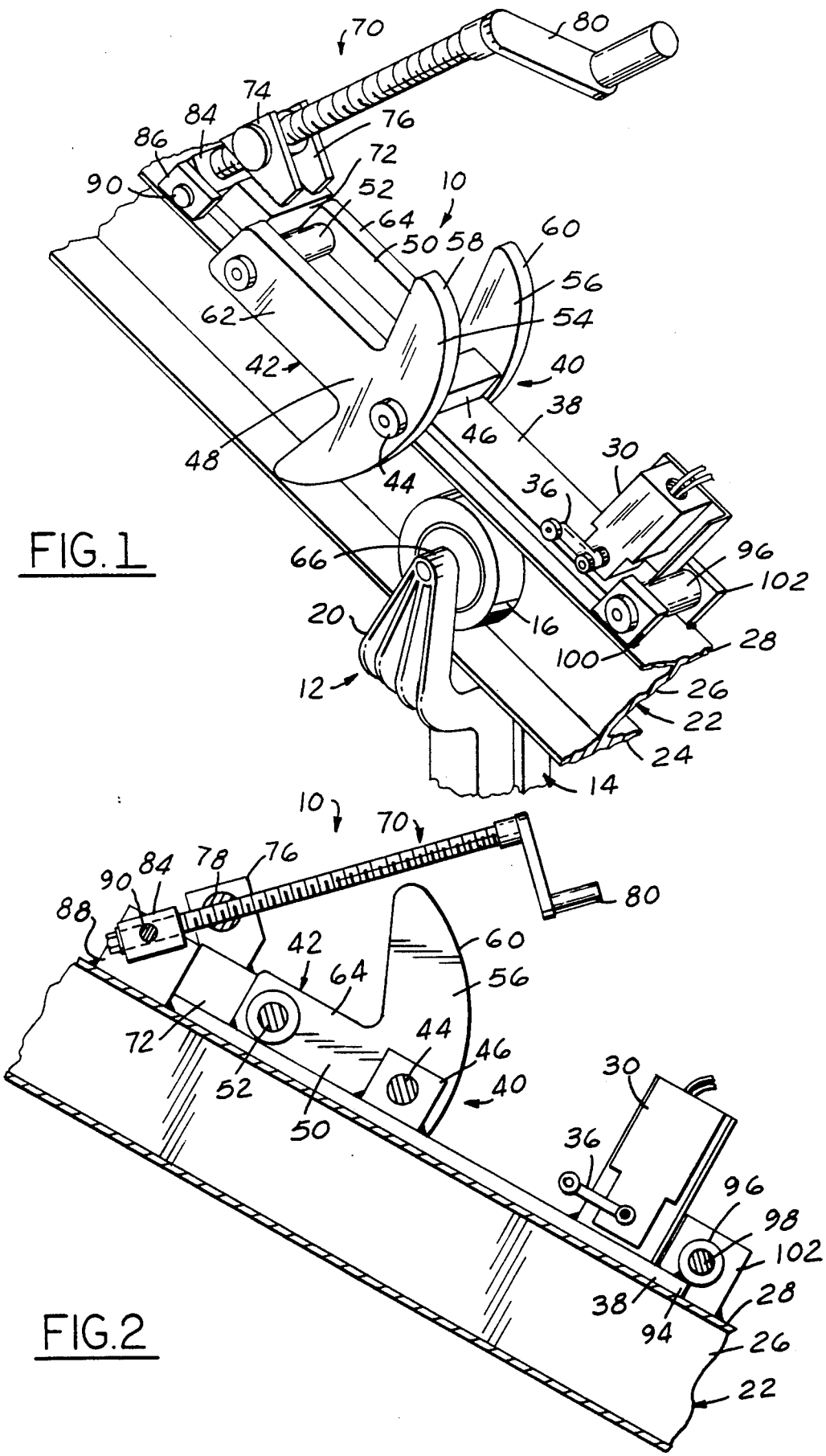
FIG. 1 is a view in perspective of the conveyor anti-runaway apparatus of the present invention mounted on a conveyor rail.
FIG. 2 is a side elevational view of the structure shown in FIG. 1 as seen from the left side with portions broken away for the purpose of clarity.

The lower segments of the crescent portions 54, 56 extend downwardly past the outer edges of the upper flange 28 into the path of the upper ends 66, 68 of the castor structure 20 when the tripping arm structure 42 is in the normal position shown in FIG. 1. As will be noted the ends 66, 68 are rounded so they can have a smooth camming action against the curved outer surfaces 58, 60 of crescent portions 54, 56 when contact is made therewith.

Figure 3:
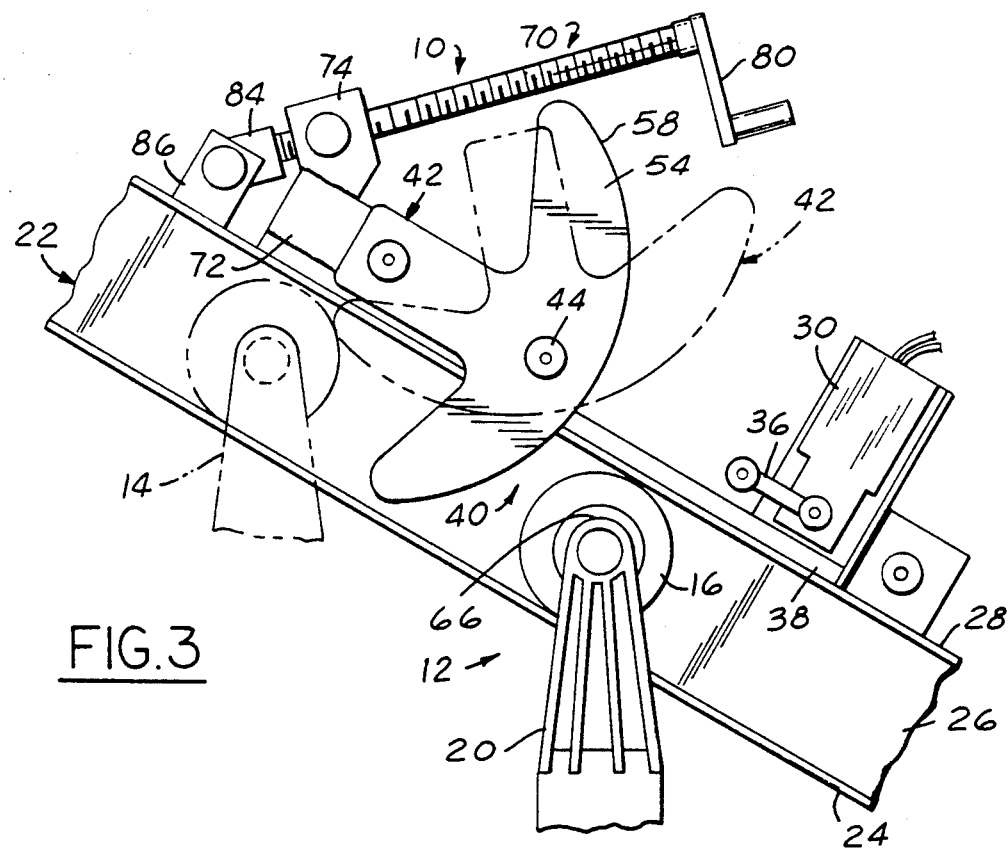
FIG. 3 is a view similar to FIG. 2 illustrating conveyor wheel structure moved into contact with the tripping arm structure of a switch tripping device forming part of the anti-runaway apparatus.

When the conveyor structure is in motion, the spaced apart wheel structures 14 continually move past the tripping arm structure 42. As will be noted in FIG. 3, each time a wheel structure moves by the tripping arm structure 42, the castor upper ends 66, 68 bump the curved outer surfaces 58, 60 causing the tripping arm structure 42 to pivot in the clockwise direction as shown in dotted lines. However, the moment of the tripping arm structure 42 about the pivot mount pin 44 is sufficient to cause the tripping arm structure to return to its normal position each time it is bumped by a wheel structure which is moving at an acceptably low speed. The tripping arm structure 42 will thus move between the normal position illustrated in FIG. 3 to the dotted line position and then back to the full line position which is established by abutment of the cylindrical element 52 against the flange 28.

Figure 4:
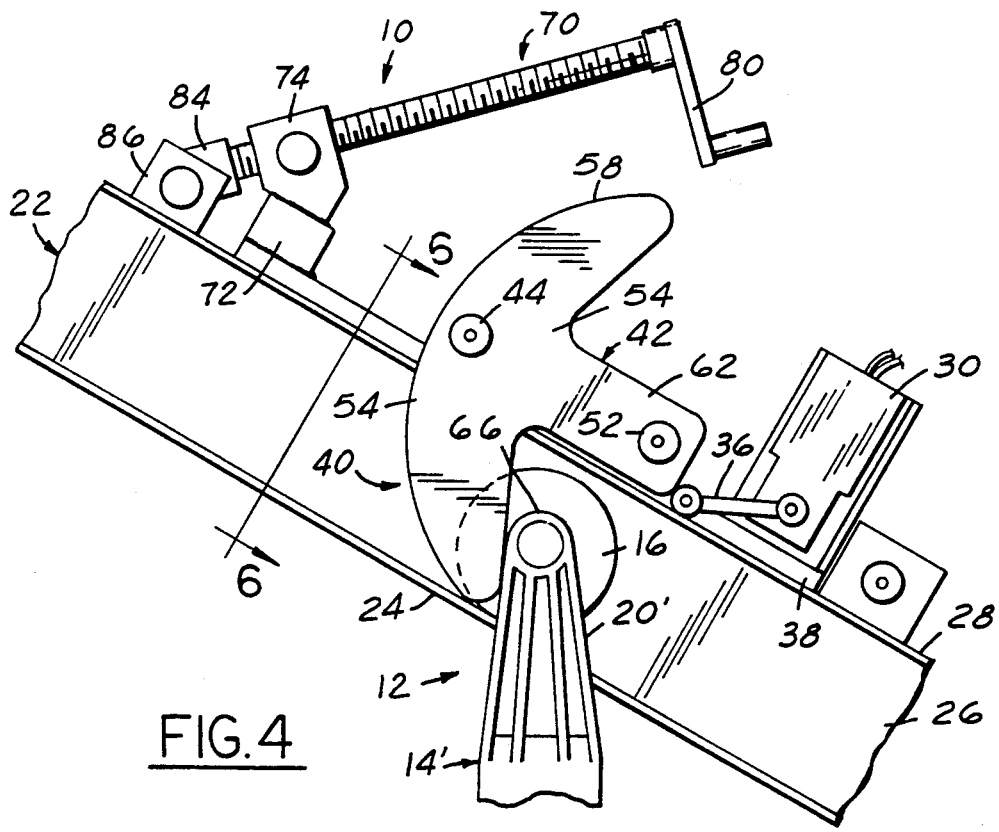
FIG. 4 is a view similar to FIG. 3 illustrating the tripping arm structure pivoted into a tripping position to stop the conveyor.

However, when the conveyor 12 is moving at an unacceptably high speed, referred to as "runaway", it is desired to shut the conveyor down. Of course, when the conveyor is moving at such speeds, the wheel structures 14 will be carried along at the same speeds. Thus, the wheel structures 14 are a suitable measure for speed control. When the wheel structures are moving at an unacceptably high speed. The castor structure 20 will bump the crescent portions 54, 56 with sufficient impact to result in the arm portions 62, 64 pivoting overcenter of the pivot mount pin 44 and thence into contact with the switch actuator 36 as shown in FIG. 4. The outer end of the tripping arm portion 62 will impinge against the outer end of the switch actuator 36 causing the actuator to move downwardly as shown in FIG. 4. At this time, the switch 30 will be open, causing the electric motor 32 to deenergize and stop thus causing the conveyor to come to a halt. The next succeeding castor structure 20' will normally advance enough to impinge against the crescent portions 54, 56 and jam the switch 30 in the open position thus preventing re-energization of the electric motor 32. The crescent portions 54, 56 thereafter function to block passage of conveyor wheel structures 14 thereby.

Figure 5:
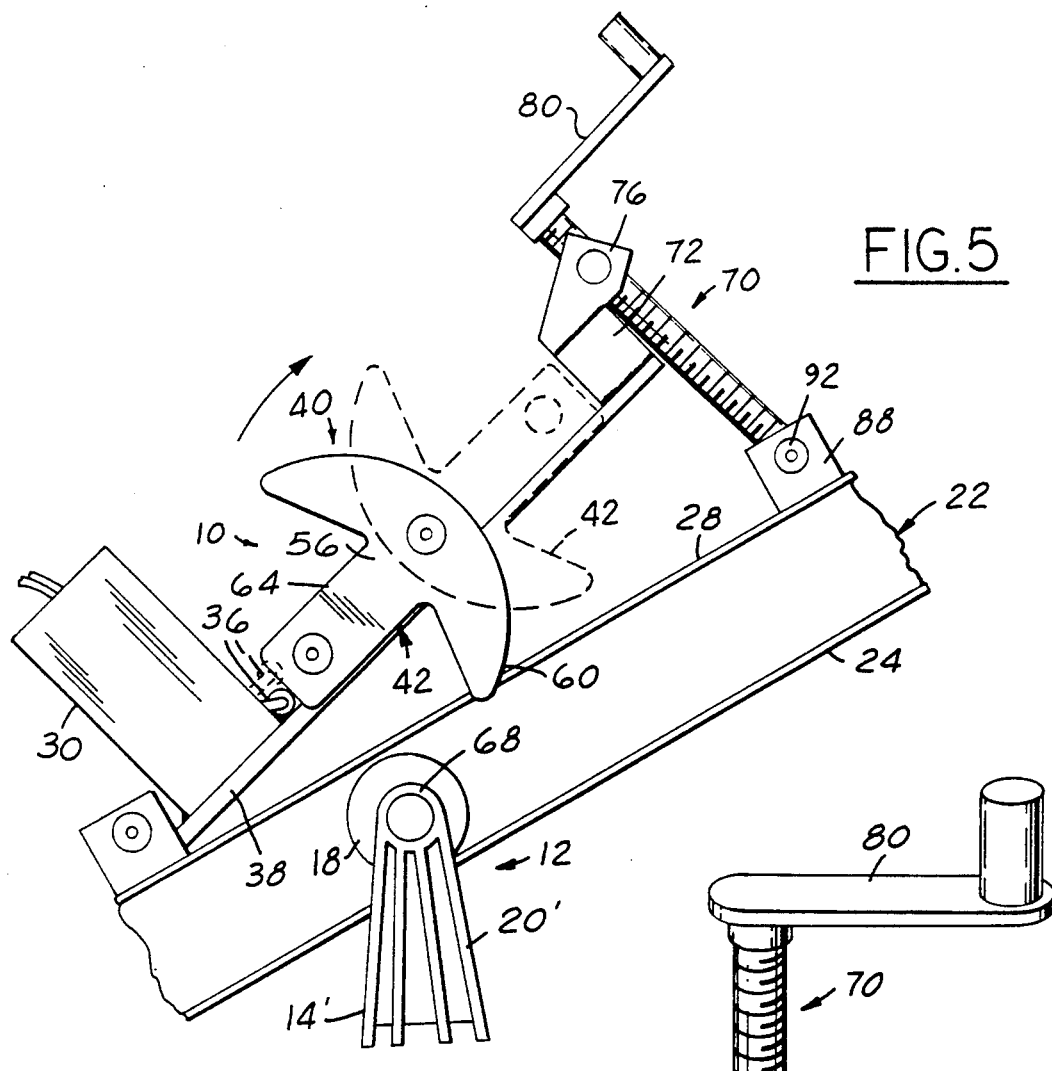
FIG. 5 is a view similar to FIG. 4 illustrating the reset procedure for the anti-runaway apparatus.

Additional structure is provided for quick resetting of conveyor 12 to permit restarting thereof as required. This structure includes a jackscrew 70 and jackscrew support structure. The jackscrew support structure includes a block 72 from which extend a pair of upstanding arms 74, 76 which are secured to the plate 38 as by welding. A cylindrical element 78 extends between the arms 74, 76. The cylindrical element 78 is pivotally mounted to permit some angular displacement of the jackscrew 70 during actuation thereof. The cylindrical element 78 has an internally threaded opening therein with the jackscrew 70 threadingly extending therethrough. Manually engagable crank means 80 are provided on the upper end of the jackscrew 70. The lower end of the jackscrew 70 is unthreaded and rotatably extends through a box-like collar 84 and is held in place by means of a nut 86 provided on the lower end thereof. The collar 84 extends between a pair of plates 86, 88 which are secured to the upper flange 28 as by welding. The collar 84 is pivotally mounted on oppositely disposed pins 90, 92 (FIGS. 1 and 5). The pins 90, 92 do not extend through the jackscrew 70. The jackscrew 70 may thus pivot.

Referring to FIGS. 1 and 2, it will be noted that one end 94 of the plate 38 is secured to cylindrical sleeve 96 as by welding. The sleeve 96 is rotatably mounted on a cylindrical element 98 which extends between a pair of upstanding flanges 100, 102 which are secured to the upper flange 28 of the rail 22. The plate is pivotable about the cylindrical element 98 as an axis by the jackscrew 70.

When the jackscrew 70 is rotated to pivot the plate 38 upwardly about the cylindrical element 98 as an axis, the tripping arm structure 42 will move out of engagement with the wheel structure 14' as shown in FIG. 5. The tripping arm structure 42 may then be manually pivoted back to its normal position as shown in dotted lines. This will cause the switch 30 to automatically close, it being remembered that the switch actuator 36 is biased to the closed position. Thus, the conveyor 12 could restart before the switch tripping device 40 is reset. This problem may be avoided by providing a manual reset for the application of power after the tripping arm structure 42 is pivoted back to its normal position. The jackscrew 70 is then rotated to return the plate 38 back to its normal position and the conveyor 12 may then be restarted.

I claim:

1. A conveyor anti-runaway apparatus for a conveyor of the type driven by an electric motor connected to a source of electrical power, the conveyor including a plurality of spaced apart wheel structures along the length thereof which ride on rails, the conveyor anti-runaway apparatus comprising a normally closed electric switch connected between the conveyor electric motor and the source of electrical power, the electric switch including a switch actuator movable between closed and open positions, a switch tripping device mounted on the upper side of a conveyor rail, a tripping arm structure, a pivot mount pivotably mounting the tripping arm structure on the switch tripping device, the tripping arm structure having an upper segment on one side of the pivot mount and a lower segment on the other side of the pivot mount, the tripping arm structure having a normal position with the lower segment extending into the path of the conveyor wheel structures to be bumped thereby and cause pivoting of the tripping arm structure each time a wheel structure passes by, the tripping arm structure including an elongated arm portion extending from the pivot mount at substantially right angles to the upper and lower segments, the moment of the elongated arm portion about the pivot mount being sufficient to cause the tripping arm structure to return to its normal position each time it is bumped by a wheel structure which is moving at an acceptably low speed and insufficient to cause such return when the wheel structure is moving at an unacceptably high speed resulting in the tripping arm structure pivoting entirely around the pivot mount into contact with the switch actuator causing the switch actuator to move to the open position thus interrupting electrical power to the electric motor and causing the conveyor to stop, the elongated arm portion including a stop structure adjacent the end thereof remote from the pivot mount, the stop structure abutting against the conveyor rail when the tripping arm structure is in its normal position and also when the tripping arm structure is pivoted to cause the switch actuator to move to the open position to thereby prevent further pivoting in either direction, the upper segment moving into the path of the conveyor wheel structures when the tripping arm structure is pivoted to cause the switch actuator to move to the open position and thereafter functioning to block passage of conveyor wheel structures thereby, the electric switch is mounted on the switch tripping device, the switch tripping device being pivotably mounted on the conveyor rail, jackscrew support structure including an internally threaded opening, the jackscrew support structure extending upwardly from said conveyor rail, a jackscrew threadingly extending through said opening, manually engagable crank means provided on one end of the jackscrew, the other end of the jackscrew being rotatably connected to the switch tripping deivce whereby the tripping arm structure is movable out of its wheel structure blocking position by actuation of the jackscrew to pivot the switch tripping device upwarldy and away form said conveyor rail so that the tripping arm structure can be manually pivoted back to its initial position to reset the switch tripping device to permit restarting of the conveyor.

2. A conveyor anti-runaway apparatus as set forth in claim 1, wherein the upper segment and lower segment of the tripping arm structure are connected together and define a crescent shape.

3. A conveyor anti-runaway apparatus as set forth in claim 3, wherein the crescent shape defines a curved surface which functions as a camming surface for the conveyor wheel structures to facilitate passage thereby.

* * * * *